United States Patent
Sorrell et al.

(10) Patent No.: US 9,559,405 B2
(45) Date of Patent: Jan. 31, 2017

(54) DEVICES AND METHODS RELATED TO A DISPLAY ASSEMBLY INCLUDING AN ANTENNA

(75) Inventors: David J. Sorrell, Fleet (GB); John Hillan, Hants (GB); Stephen Frankland, Horsham (GB)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 12/779,783

(22) Filed: May 13, 2010

(65) Prior Publication Data

US 2010/0315389 A1    Dec. 16, 2010

Related U.S. Application Data

(60) Provisional application No. 61/186,774, filed on Jun. 12, 2009.

(51) Int. Cl.
*H01Q 1/22*  (2006.01)
*H01Q 1/24*  (2006.01)
*H01Q 1/27*  (2006.01)

(52) U.S. Cl.
CPC .............. *H01Q 1/22* (2013.01); *H01Q 1/243* (2013.01); *H01Q 1/273* (2013.01)

(58) Field of Classification Search
CPC .......... H01Q 1/22; H01Q 1/243; H01Q 1/273; G06F 1/1698; G06F 1/1626; G06F 1/1637; H02J 7/0027; H04B 5/0037; H04B 5/0081; H04B 1/3833; H04M 1/7253; H04R 1/1025

USPC .......... 345/169, 76–104, 204–206; 455/566, 455/573, 575.1, 575.5; 361/679.21–679.3
See application file for complete search history.

(56) References Cited

U.S. PATENT DOCUMENTS

| | | | |
|---|---|---|---|
| 5,710,987 A * | 1/1998 | Paulick .................... | 455/575.7 |
| 6,011,519 A | 1/2000 | Sadler et al. | |
| 7,215,600 B1 | 5/2007 | DeRosa | |
| 2001/0035853 A1* | 11/2001 | Hoelen et al. .............. | 345/102 |
| 2002/0151328 A1* | 10/2002 | Shin et al. .................. | 455/557 |
| 2004/0229648 A1* | 11/2004 | Yamamoto et al. ......... | 455/557 |
| 2007/0232371 A1 | 10/2007 | Soekawa et al. | |
| 2007/0287508 A1* | 12/2007 | Telefus ....................... | 455/572 |
| 2008/0014897 A1* | 1/2008 | Cook et al. ................ | 455/343.1 |
| 2009/0072628 A1 | 3/2009 | Cook et al. | |
| 2010/0036773 A1* | 2/2010 | Bennett ...................... | 705/67 |

FOREIGN PATENT DOCUMENTS

| | | |
|---|---|---|
| CN | 101452521 A | 6/2009 |
| EP | 0543645 | 5/1993 |

(Continued)

OTHER PUBLICATIONS

International Search Report and Written Opinion—PCT/US2010/038437—International Search Authority, European Patent Office, Oct. 18, 2010.

(Continued)

*Primary Examiner* — Stephen Sherman
(74) *Attorney, Agent, or Firm* — Knobbe Martens Olson & Bear LLP

(57) ABSTRACT

Exemplary embodiments are directed to a display assembly. A display assembly may comprise a display unit and at least one antenna at least partially surrounding at least a portion of the display unit. The at least one antenna may be configured for at least one of receiving wireless power, transmitting data, and receiving data.

26 Claims, 10 Drawing Sheets

(56) References Cited

FOREIGN PATENT DOCUMENTS

| | | |
|---|---|---|
| EP | 1263114 | 12/2002 |
| EP | 1555714 | 7/2005 |
| EP | 1600887 | 11/2005 |
| EP | 1641140 A1 | 3/2006 |
| EP | 2093701 A1 | 8/2009 |
| JP | 2005026865 A | 1/2005 |
| JP | 2007124557 A | 5/2007 |
| JP | 2007274551 A | 10/2007 |
| JP | 2007325339 A | 12/2007 |
| JP | 2008301295 A | 12/2008 |
| JP | 2010539876 A | 12/2010 |
| KR | 20090010431 A | 1/2009 |
| WO | WO-2008059564 A | 5/2008 |
| WO | WO2009014366 | 1/2009 |
| WO | 2009036406 A1 | 3/2009 |
| WO | WO-2010144886 A1 | 12/2010 |

OTHER PUBLICATIONS

Chinese Office Action issued on Apr. 13, 2015—U.S. Appl. No. 201080026154.8, filed Jun. 11, 2010—State Intellectual Property Office (SIPO), Apr. 13, 2015.

Japanese Office Action issued Jan. 4, 2016—U.S. Appl. No. 2014-11173, filed Jan. 24, 2014—Japanese Patent Office (JIPO), Apr. 1, 2016.

* cited by examiner

DEVICES AND METHODS RELATED TO A DISPLAY ASSEMBLY INCLUDING AN ANTENNA

CLAIM OF PRIORITY UNDER 35 U.S.C. §119

This application claims priority under 35 U.S.C. §119(e) to:

U.S. Provisional Patent Application 61/186,774 entitled "DISPLAY ASSEMBLY WITH BUILT IN COIL ANTENNA" filed on Jun. 12, 2009, the disclosure of which is hereby incorporated by reference in its entirety.

BACKGROUND

Field

The present invention relates generally to wireless power, and more specifically to a display assembly including at least one antenna.

Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

A need exists for a display assembly including a display unit and at least one antenna configured for near-field communication, wireless charging, or both.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
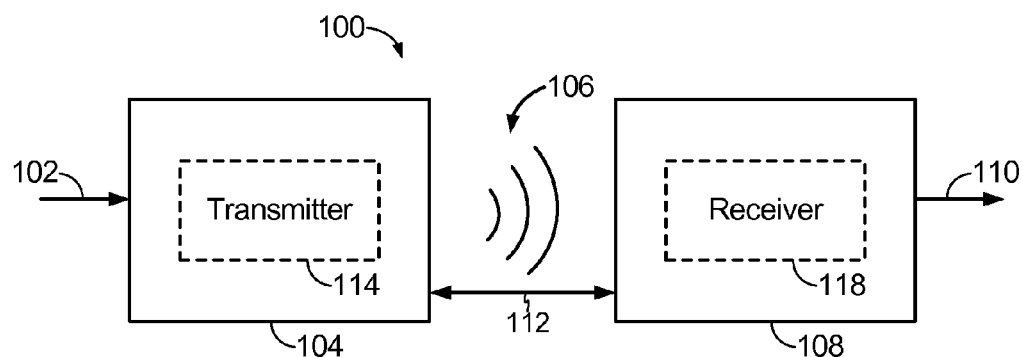
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. It is noted that, although antenna 118 is referred to as a "receive antenna," receive antenna 118 may be configured to receive and transmit data via near-field communication means. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
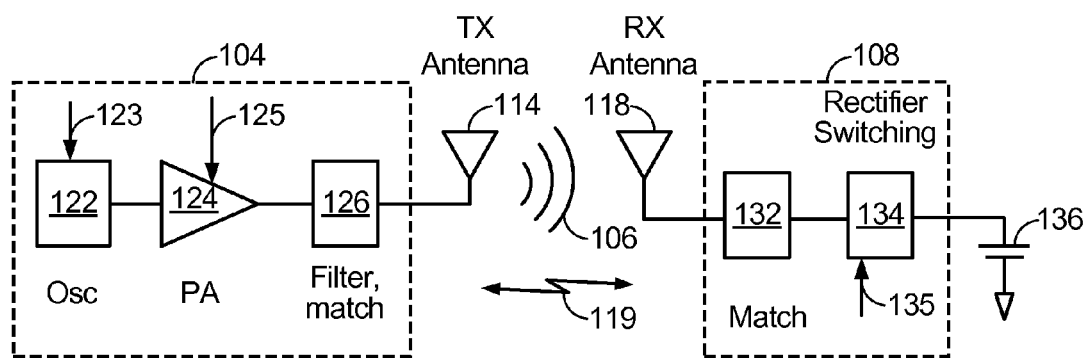
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3A:
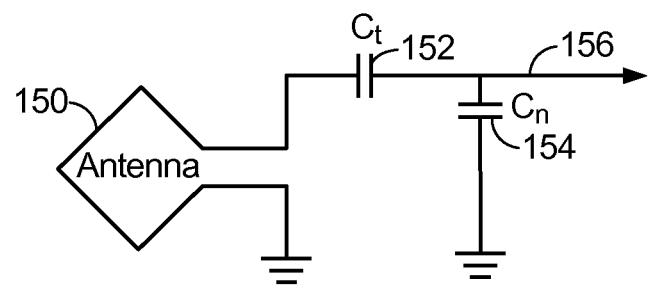
FIG. 3A illustrates a schematic diagram of a loop antenna for use in exemplary embodiments of the present invention.

As illustrated in FIG. 3A, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 3B:
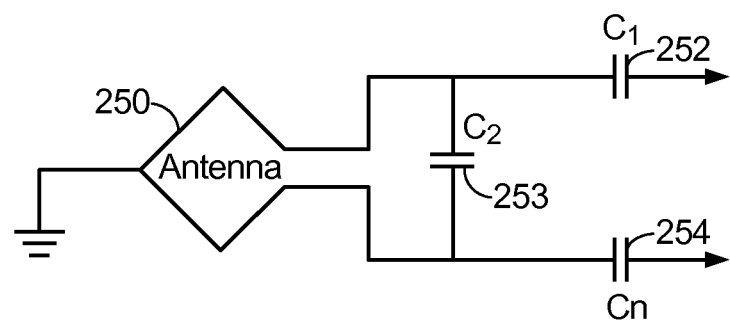
FIG. 3B illustrates an alternate embodiment of a differential antenna used in exemplary embodiments of the present invention.

FIG. 3B illustrates an alternate embodiment of a differential antenna 250 used in exemplary embodiments of the present invention. Antenna 250 may be configured as a differential coil antenna. In a differential antenna configuration, the center of antenna 250 is connected to ground. Each end of antenna 250 are connected into a receiver/transmitter unit (not shown), rather than having one end connected to ground as in FIG. 3A. Capacitors 252, 253, 254 may be added to the antenna 250 to create a resonant circuit that generates a differential resonant signal. A differential antenna configuration may be useful in situations when communication is bidirectional and transmission into the coil is required. One such situation may be for Near Field Communication (NFC) systems.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
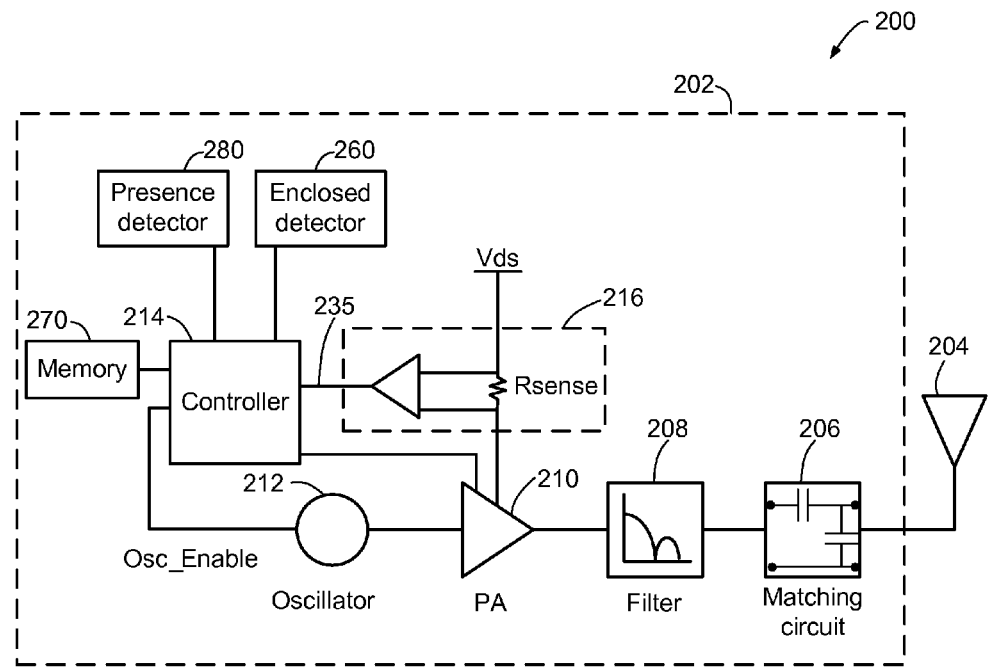
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
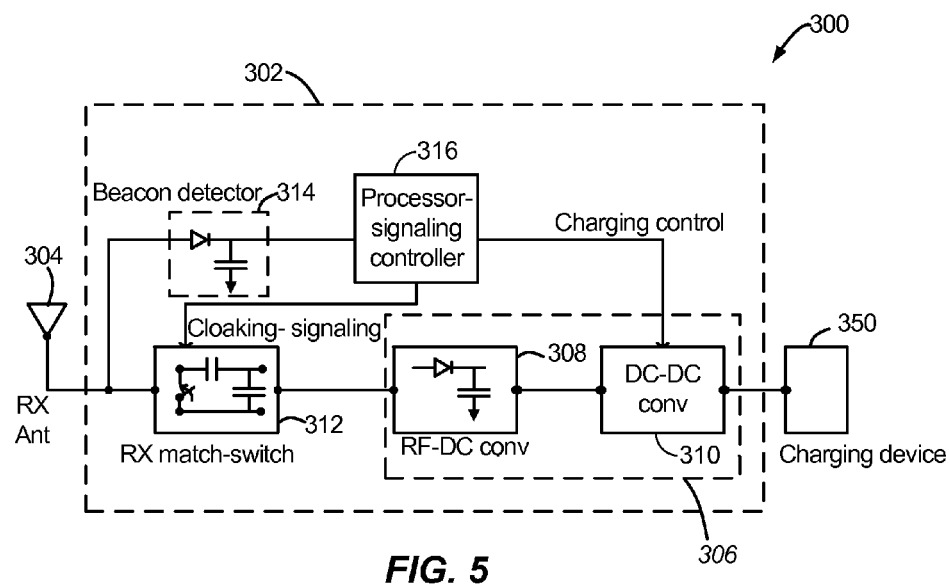
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. It is noted that, although antenna 304 is referred to as a "receive antenna," receive antenna 304 may be configured to receive and transmit data via near-field communication means. Receiver 300 further couples to device 350 for providing received power thereto. It should be noted that receiver 300 is illustrated as being external to device 350 but may be integrated into device 350.

Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters. It is noted that antenna 304 may also be configured for near-field communication.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-field. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging or near-field communication.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
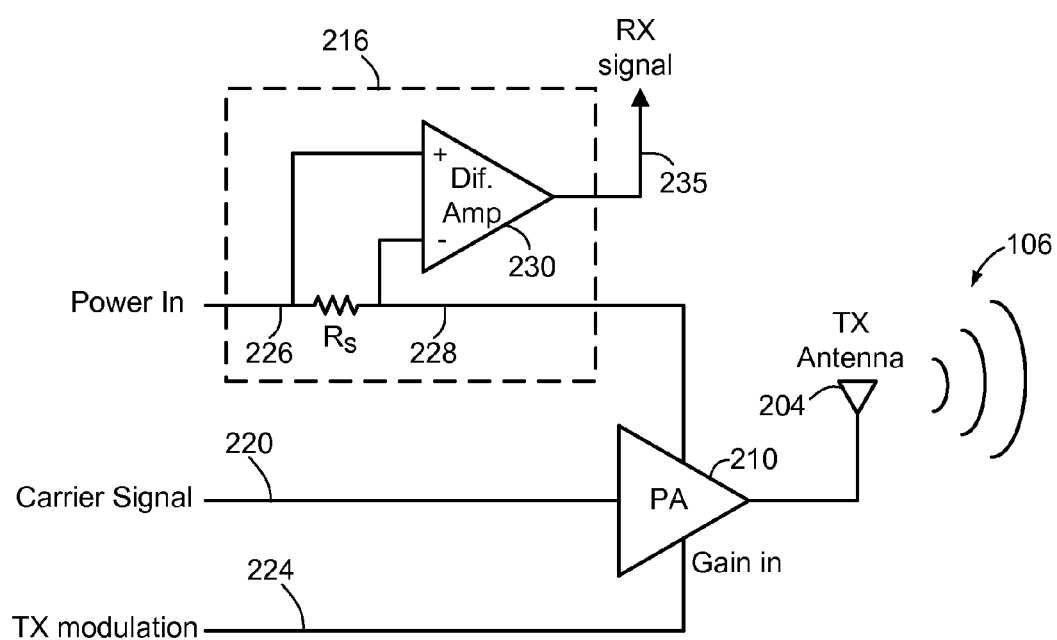
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 6 also includes a load sensing circuit 216 that supplies power to the power amplifier 210 and generates a receive signal 235 output. In the load sensing circuit 216 a voltage drop across resistor Rs develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

Various exemplary embodiments as described herein are directed to a display assembly having a display unit and at least one receive antenna. As described more fully below, the display assembly may further include a ferrite ring positioned between the display unit and the at least one receive antenna. Furthermore, the display assembly may include a magnetically transparent shell encasing the at least one receive antenna and at least a portion of the display unit.

Figure 7:
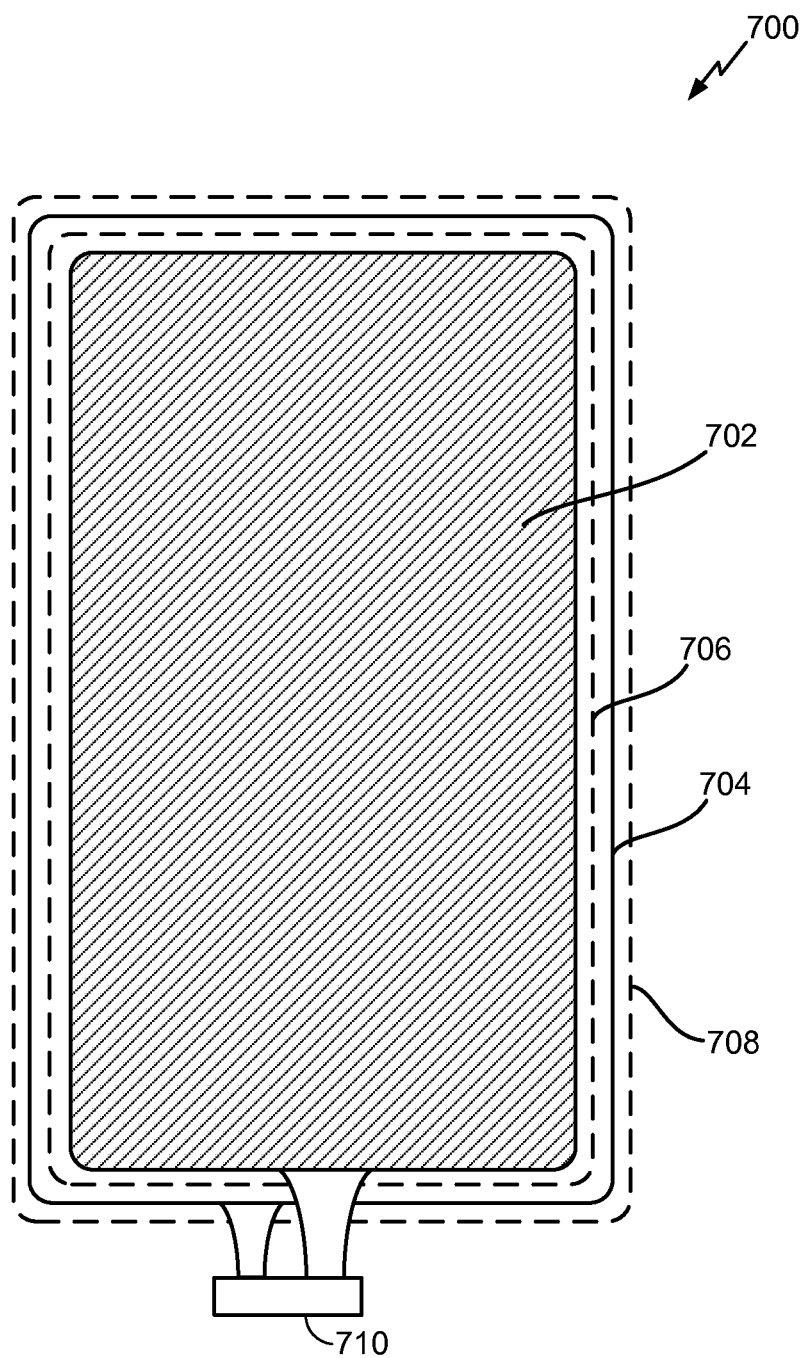
FIG. 7 illustrates a display assembly, in accordance with an exemplary embodiment of the present invention.

FIG. 7 illustrates a display assembly 700 including a display unit 702 and an antenna 704 at least partially surrounding display unit 702. For example only, antenna 704 may comprise a near-field antenna configured to receive wireless power, transmit data in accordance with near-field communication (NFC) means, receive data in accordance with NFC means, or a combination thereof. According to one exemplary embodiment, antenna 704 may comprise a coil antenna having one or more windings. It is noted that a perimeter of display unit 702 may at least indirectly support antenna 704.

As described more fully below, a ferrite material may be positioned between antenna 704 and display unit 702 and, therefore, it is not required that display unit 702 to be in contact with antenna 702 to indirectly support antenna 702. A non-limiting example of indirectly supporting may include an orientation or arrangement of one or more intermediate layers or materials, such as a ferrite material or ring positioned around a perimeter of display unit 702 which provides direct support to antenna 704 resulting in indirect support being provided by display unit 702.

Furthermore, a perimeter of display unit 702 may substantially define a circumference of at least one winding of antenna 704. Display unit 702 may comprise any known elements of a conventional display unit. For example only, display unit 702 may comprise, for example only, a display screen, a touch screen, one or more display drivers, one or more lighting devices (e.g., back lighting devices), one or more sensors, one or more connectors, one or more feedback elements, or any combination thereof. In addition display assembly 700 may comprise a connector 710, which may be operably coupled to each of antenna 704 and display unit 702.

According to one exemplary embodiment, connector 710, which may comprise a display unit connector, may include one or more connections for antenna 704. Furthermore, it is noted that antenna 704 may share one or more connections (not shown) of connector 710 with display unit 702. By way of example only, antenna 704 and display unit 702 may share a common ground pin of connector 710. It is noted that a single connector may reduce size and/or costs of display assembly 700. Although display assembly 700 is illustrated as only having a single connector 710, wherein each of antenna 704 and display unit 702 share connector 710, the present invention is not so limited. Rather, antenna 704 and display unit 702 may each have a dedicated connector.

According to one exemplary embodiment, display assembly 700 may further include a ring 706 comprising ferrite material at least partially surrounding display unit 702 and positioned between display unit 702 and antenna 704. According to one exemplary embodiment, ring 706 may be configured to shape a magnetic field associated with antenna 704. It is noted that in an exemplary embodiment wherein display unit 702 does not include metallic components (e.g., display unit 702 comprises glass, plastic, or both), ring 706 may not be required.

In addition, display element 700 may include a shell 708, which may encase antenna 704 and at least a portion of display unit 702. Furthermore, in an exemplary embodiment comprising ring 706, each of display unit 702, antenna 704, and ring 706 may be at least partially encased within shell 708. Shell 708 may also be referred to herein as a wrapper or a case. It is noted that shell 708 may comprise a magnetically transparent material.

Figure 8:
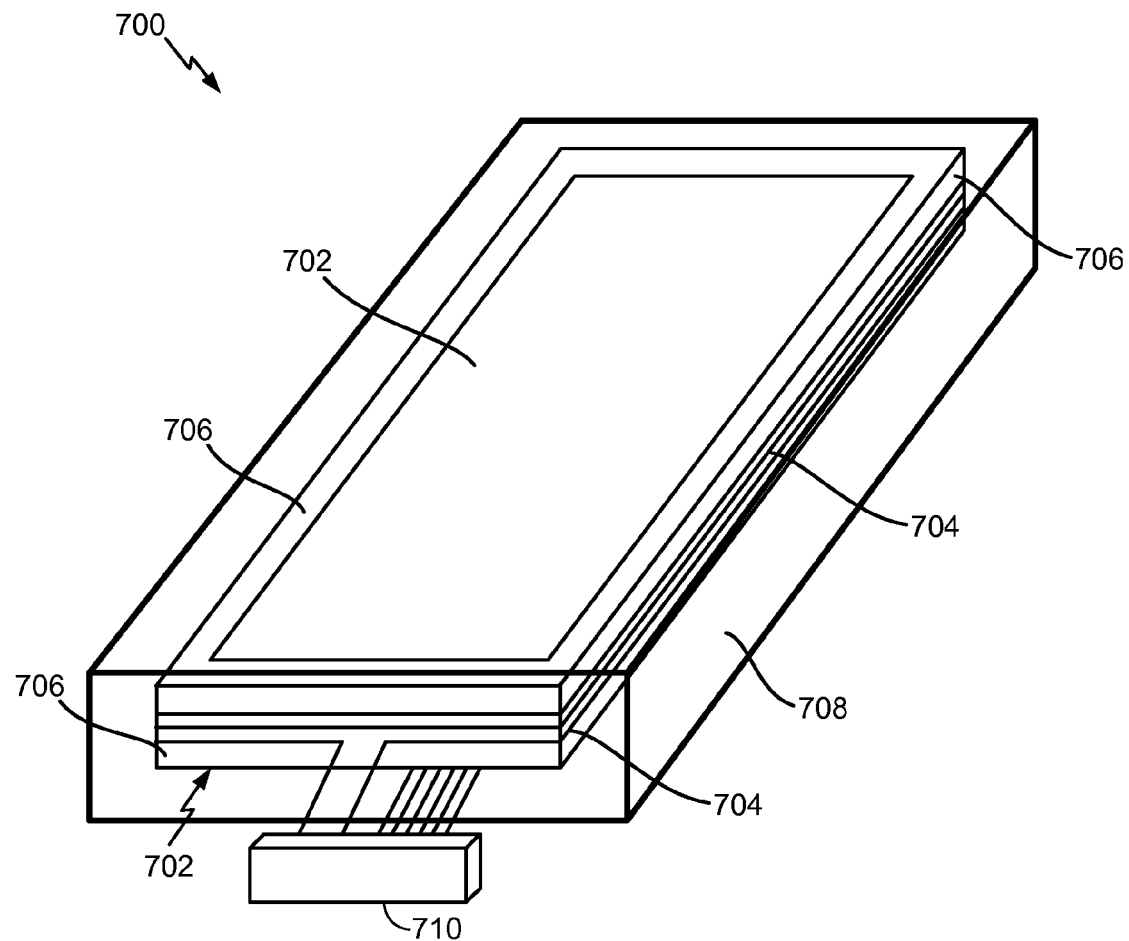
FIG. 8 is another illustration of the display assembly of FIG. 7, according to an exemplary embodiment of the present invention.

FIG. 8 is another illustration of display assembly 700 comprising display unit 702 and antenna 704 as least partially surrounding display unit 702. As illustrated in FIG. 8, display unit 702 may have a thickness T. Furthermore, display assembly 700 may comprise ring 706 at least partially surrounding and adjacent to an outer edge of display unit 702. According to one exemplary embodiment, ring 706 may also have a thickness T and, thus, may substantially align with an outer edge of display unit 702. According to another embodiment, ring 706 may comprise a thickness less than a thickness of display unit 702. However, it is noted that in an exemplary embodiment comprising ring 706, ring 706 may be positioned between display unit 702 and antenna 704.

FIG. 8 also illustrates display unit 702, antenna 704, shell 708, and ring 706 encased within shell 708. Furthermore, display assemble 700 may further include connector 710 configured to enable each of antenna 704 and display unit 702 to operably couple to components external to display assembly 700.

Figure 9:
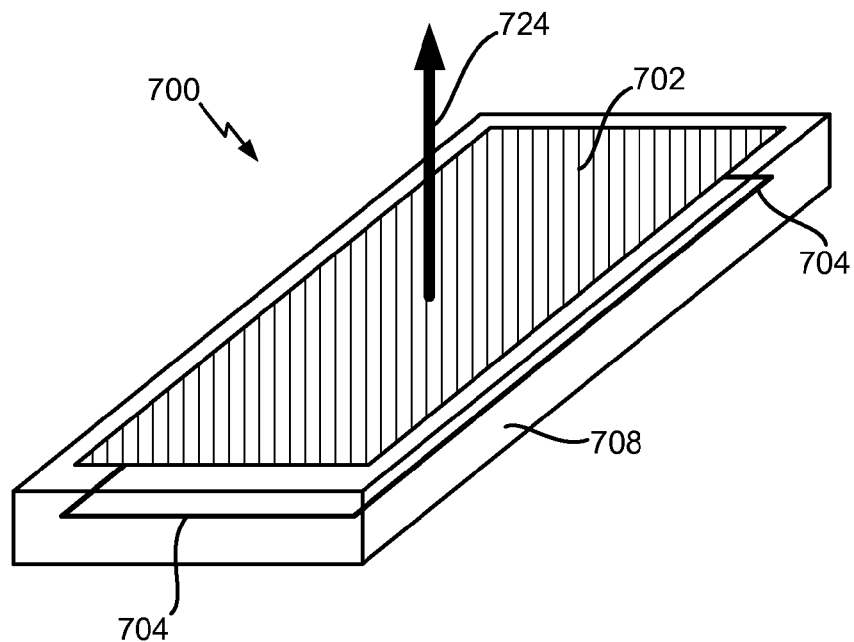
FIG. 9 illustrates a front side view of the display assembly of FIGS. 7 and 8, according to an exemplary embodiment of the present invention.
Figure 10:
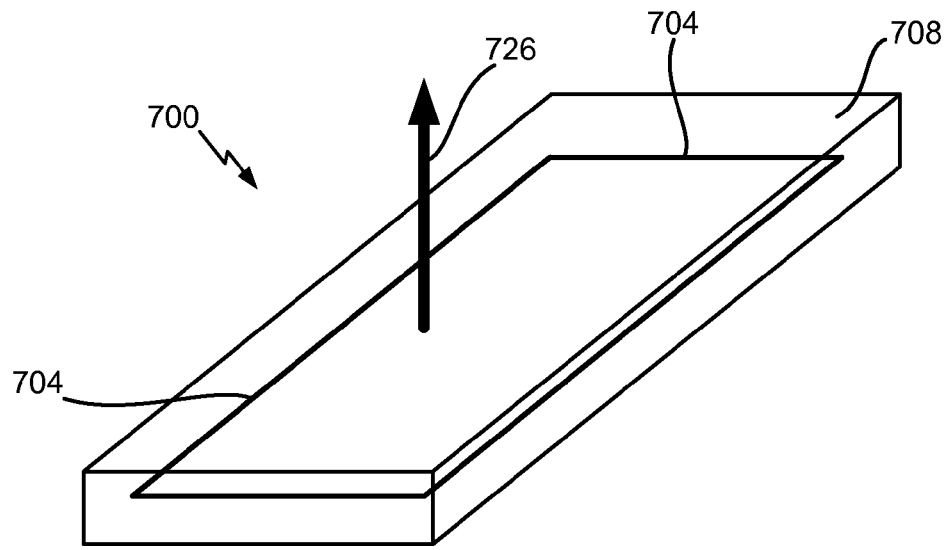
FIG. 10 illustrates a backside view of the display assembly of FIGS. 7 and 8, in accordance with an exemplary embodiment of the present invention.

FIG. 9 is another illustration of display assembly 700 having a front side 720. Further, FIG. 10 illustrates display assembly 700 having a backside 722, which is opposite front side 720 illustrated in FIG. 9. With reference to FIGS. 9 and 10, it is noted that display assembly 700 may be configured to enable a magnetic flux (illustrated by arrows 724 and 726 in FIGS. 9 and 10, respectively) to radiate out from antenna 704, or from an external antenna (not shown) and pass through antenna 704, from each of front side 720 and backside 722 of display assembly 700. Accordingly, antenna 704 may wirelessly receive power, receive data via NFC means, and transmit data via NFC means while being positioned on or near a device, which contains a suitable antenna (e.g., a charging surface and/or an NFC reader/writer), in either a face-up or face-down position.

As illustrated in FIG. 9, antenna 704 is separated from display unit 702 having a clearance therebetween. The term "clearance," as used herein, may comprise a vacant space, a space comprising a non-conductive component, or any combination thereof. In the example depicted in FIG. 9, a portion of a clearance may include a magnetically vacant or transparent space positioned between antenna 704 and display unit 702. Accordingly, a clearance may provide an escape path for a magnetic field, which may be associated with and adjacent to antenna 704. Specifically, display assembly 700, as configured, may provide an escape path entirely around antenna 704. As mentioned above, an escape path adjacent to antenna 704 may enable a magnetic field to exist around antenna 704 and, thus, the functionality of an associated wireless receive antenna may be enhanced. Furthermore, any adverse affect on a magnetic field adjacent to and associated with antenna 704 resulting from a conductive component (i.e., magnetically conductive portions of display unit 702), may be limited. By way of example, the clearance may be provided by a magnetically non-conductive edge of display unit 702.

Figure 11:
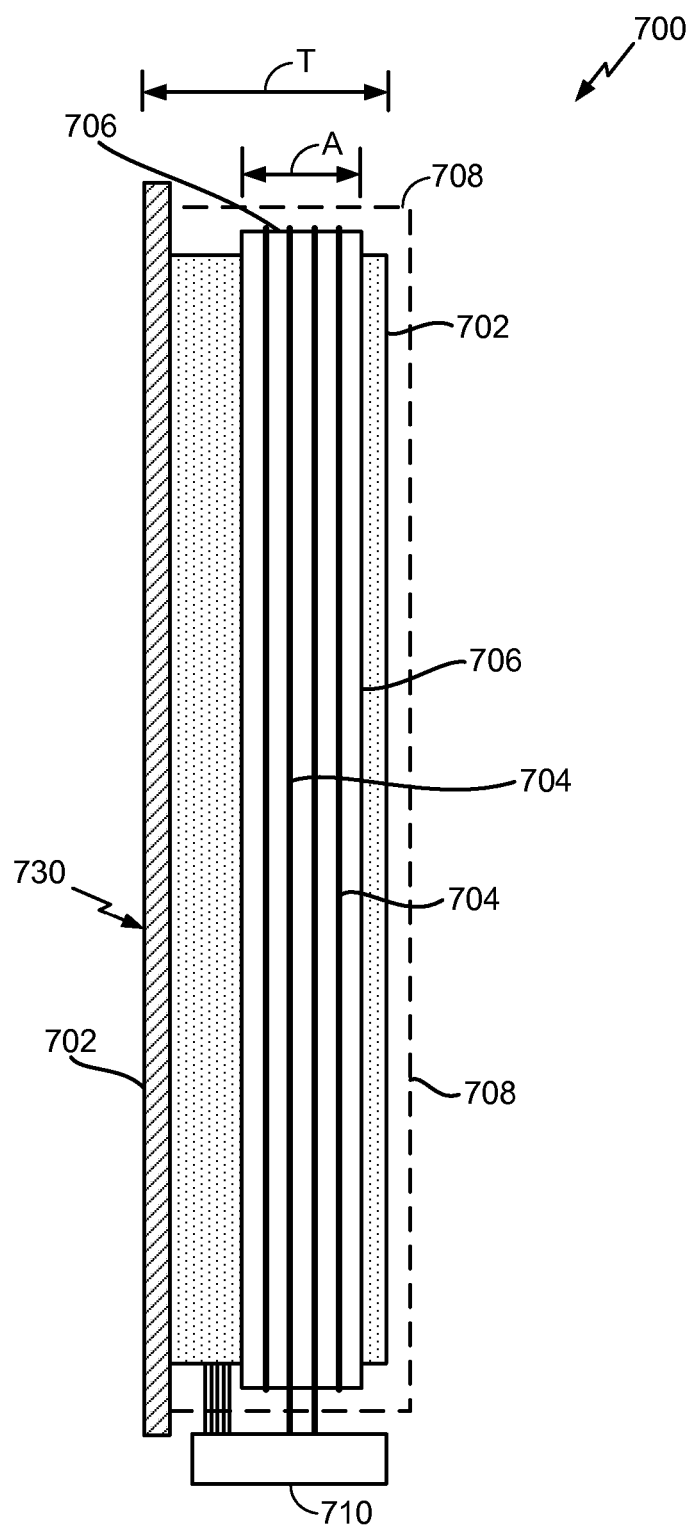
FIG. 11 illustrates a side view of the display assembly of FIGS. 7-10, according to an exemplary embodiment of the present invention.

FIG. 11 illustrates a side view of display assembly 700 having display unit 702 and antenna 704 at least partially surrounding a portion of display unit 702. Although antenna 704 is illustrated in FIG. 11 as having four windings, antenna 704 may comprise any number of windings. Furthermore, display assembly 700 comprises ring 706 at least partially surrounding and adjacent to at least a portion of an outer edge of display unit 702. As noted above, ring 706 may be positioned between antenna 704 and display unit 702 and, therefore, may physically separate antenna 704 from display unit 702. Furthermore, it is noted that ring 706, as illustrated in FIG. 11, has a thickness A, which is less than a thickness T of display unit 702.

With continued reference to FIG. 11, display assembly 700 may comprise shell 708 encasing each of display unit 702, antenna 704, and ring 706. It is noted that a screen 730 (e.g., a glass screen) of display unit 702 may be positioned outside of shell 708. Furthermore, display assembly 700 may comprise connector 710, which may be operably coupled to each of antenna 704 and display unit 702.

Figure 12:
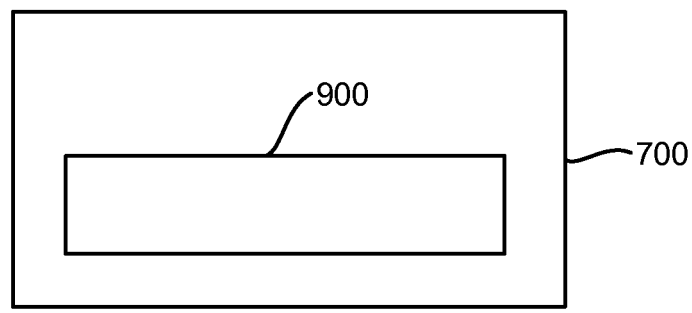
FIG. 12 illustrates a display assembly including a near-field communication system, in accordance with an exemplary embodiment of the present invention.
Figure 13:
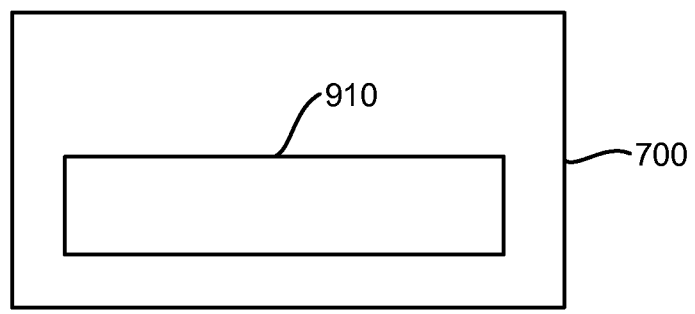
FIG. 13 illustrates a display assembly including a wireless charging system, according to an exemplary embodiment of the present invention.
Figure 14:
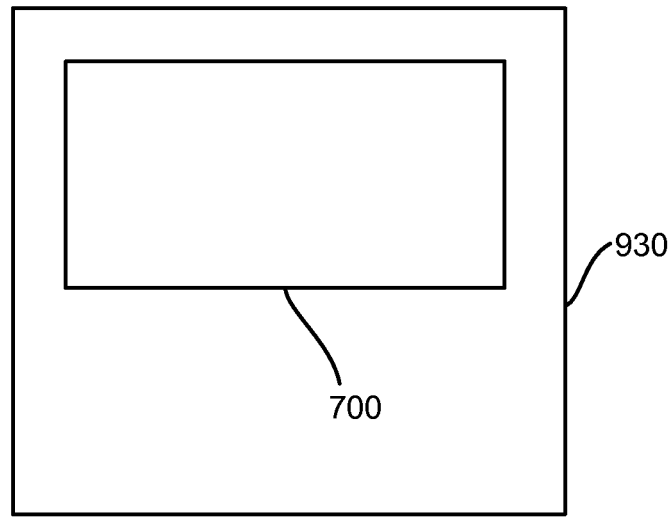
FIG. 14 illustrates an electronic system including a display assembly, according to an exemplary embodiment of the present invention.

With reference to FIG. 12, according to an exemplary embodiment of the present invention, an NFC system 900 may be positioned (e.g., embedded) within display assembly 700. It is noted that in this exemplary embodiment, antenna 704 (see FIGS. 7-11) may not need to be connected to an external connector (e.g., connector 701; see FIGS. 7-11). However, the connector (e.g., connector 710 may require a host interface port, such as an 12C, as will be understood by a person having ordinary skill in the art. In accordance with another exemplary embodiment, as illustrated in FIG. 13, a wireless charging system 910 (e.g., receiver 302 in FIG. 5) may be at least partially positioned (e.g., embedded) within display assembly 700. It is noted that in this exemplary embodiment, it may not be required for antenna 704 (see FIG. 7-11) to be connected to an external connector (e.g., connector 710). FIG. 14 illustrates an electronic device 930, which may comprise, for example only, a cellular telephone, a portable media player, a camera, a gaming device, a navigation device, a tool, a toy, or any combination thereof. As illustrated in FIG. 14, electronic device 930 may include display assembly 700.

Figure 15:
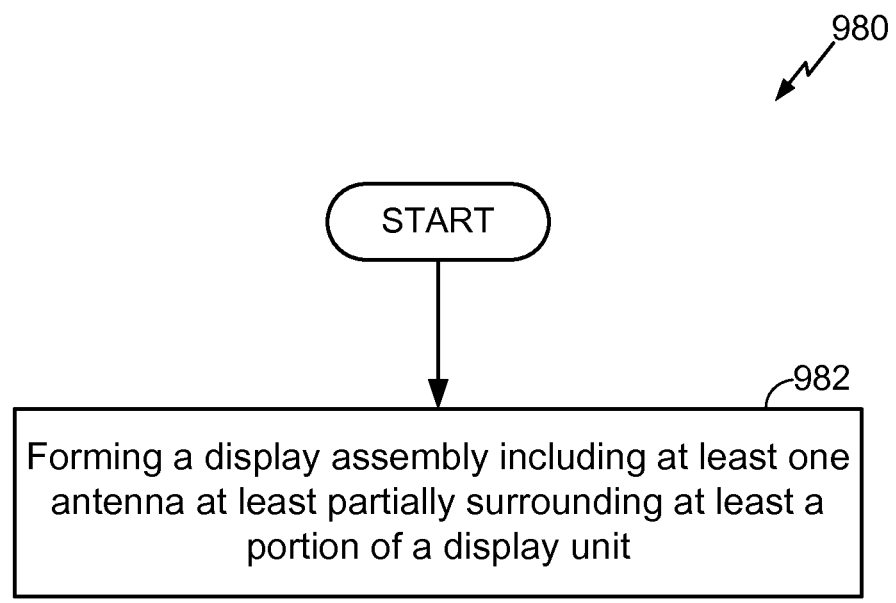
FIG. 15 is a flowchart illustrating a method, in accordance with an exemplary embodiment of the present invention.

FIG. 15 is a flowchart illustrating a method 980, in accordance with one or more exemplary embodiments. Method 980 may include forming a display assembly including at least one antenna at least partially surrounding at least a portion of a display unit (depicted by numeral 982).

Integrating an antenna, and possibly a ferrite material, into a display assembly, may reduce the complexity of the display assembly, which may reduce cost and increase reliability of an associated electronic device. Further, since electronic displays may be manufactured in large quantities, cost savings may possible compared to individual purchase of an antenna, a ferrite ring, and a display unit. Moreover, since the antenna and the ferrite material may be mounted inside a rigid display assembly, their relative position and spacing may remain constant, which may result in more stable tuning. Additionally, by placing the antenna around a display screen, an associated electronic device (e.g., a cellular telephone) may be configured to couple to a remote device (e.g., a wireless charger) in both a face-up and a face-down orientation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A display assembly, comprising:
   a display unit comprising a front surface comprising a display screen, a rear surface positioned opposite from the front surface, and a plurality of side surfaces positioned between the front surface and the rear surface;
   non-conductive material positioned over and at least partially surrounding the plurality of side surfaces and positioned between the front and rear surfaces, wherein a width of the non-conductive material between the front and rear surfaces is less than a distance separating the front surface and the rear surface; and
   an antenna comprising a coil having at least one winding separated from the display unit by and positioned over the non-conductive material, the at least one winding positioned between the front surface and the rear surface and surrounding the non-conductive material, the display unit at least indirectly supporting the antenna, the antenna configured to wirelessly transmit or receive charging power at a level sufficient to power or charge an electronic device, the antenna further configured to transmit or receive data, and the charging power and the data configured to be transmitted or received via a magnetic field.

2. The display assembly of claim 1, wherein a perimeter of the display unit substantially defines a circumference of at least one winding of the antenna.

3. The display assembly of claim 1, wherein the display unit comprises at least one of one or more display drivers, one or more lighting devices, one or more sensors, one or more connectors, or one or more feedback elements.

4. The display assembly of claim 1, further comprising a connector operably coupled to each of the display unit and the antenna.

5. The display assembly of claim 4, wherein the display unit and the antenna share one or more connections of the connector.

6. The display assembly of claim 1, wherein the non-conductive material comprises a ring comprising ferrite material.

7. The display assembly of claim 1, further comprising a shell comprising magnetically transparent material surrounding the antenna and at least a portion of the display unit.

8. The display assembly of claim 1, wherein the display unit is configured to enable a magnetic flux to radiate through each of a front side and a backside of the display assembly.

9. The display assembly of claim 1, further comprising a near-field communication system configured to transmit or receive the data via the antenna.

10. The display assembly of claim 1, further comprising a wireless charging system configured to wirelessly transmit or receive the charging power via the antenna, wherein the antenna has a resonant frequency, and wherein the wireless charging system is configured to drive the antenna with a signal having a frequency that is substantially equal to the resonant frequency to wirelessly transmit the charging power.

11. The display assembly of claim 1, wherein the display unit is integrated within the electronic device.

12. The display assembly of claim 11, wherein the electronic device comprises one of a cellular telephone, a portable media player, a camera, a gaming device, a navigation device, a tool, or a toy.

13. The display assembly of claim 1, wherein the antenna comprising the coil having at least one winding is positioned on an area being smaller than the display screen.

14. A method for wireless power and data transfer, comprising:
    forming a display assembly including an antenna comprising a coil having at least one winding;
    positioning non-conductive material over and at least partially surrounding a plurality of side surfaces of a display unit and between a front surface and a rear surface of the display unit, wherein a width of the non-conductive material between the front and rear surfaces is less than a distance separating the front surface and the rear surface; and
    positioning the at least one winding to be separated from the display unit by and positioned over the non-conductive material, the at least one winding positioned between the front surface and the rear surface and surrounding the non-conductive material, the front surface comprising a display screen, the rear surface positioned opposite from the front surface, the plurality of side surfaces positioned between the front surface and the rear surface, the non-conductive material supporting the antenna, the antenna configured to wirelessly transmit or receive charging power at a level sufficient to charge or power an electronic device, the antenna further configured to transmit or receive data, and the charging power and the data configured to be transmitted or received via a magnetic field.

15. The method of claim 14, wherein the display unit further comprises at least one of one or more display drivers, one or more lighting devices, one or more sensors, one or more connectors, and one or more feedback elements.

16. The method of claim 14, further comprising coupling a connector to each of the display unit and the antenna.

17. The method of claim 14, wherein the non-conductive material comprises a ring comprising ferrite material.

18. The method of claim 14, further comprising encasing the antenna and at least a portion of the display unit in a magnetically transparent shell.

19. The method of claim 14, further comprising positioning a near-field communication system in the display assembly for transmitting or receiving data via the antenna.

20. The method of claim 14, further comprising positioning a wireless charging system in the display assembly for wirelessly transmitting or receiving the charging power via the antenna, wherein the antenna has a resonant frequency, and wherein the wireless charging system is provided to drive the antenna with a signal having a frequency that is substantially equal to the resonant frequency to wirelessly transmit the charging power.

21. An electronic device for wirelessly receiving and transmitting power, comprising:
- means for displaying information having a plurality of side surfaces, a front surface and a rear surface, the front surface comprising a display screen, the rear surface positioned opposite from the front surface, and the plurality of side surfaces positioned between the front surface and the rear surface;
- non-conductive means positioned over and at least partially surrounding the plurality of side surfaces and positioned between the front and rear surfaces, wherein a width of the non-conductive means between the front and rear surfaces is less than a distance separating the front surface and the rear surface;
- means for wirelessly receiving or transmitting charging power at a level sufficient to power or charge a battery and for transmitting or receiving data, the receiving or transmitting means configured to surround the non-conductive means, the receiving or transmitting means comprising means for wirelessly receiving or transmitting charging power and for transmitting or receiving data via a magnetic field; and
- means for supporting the receiving or transmitting means and the non-conductive means, the supporting means positioned between the front surface and the rear surface, and the non-conductive means separating the receiving or transmitting means from the displaying means.

22. The electronic device of claim 21, wherein a perimeter of the supporting means substantially defines a circumference of at least one winding of the receiving or transmitting means.

23. The electronic device of claim 21, wherein the non-conductive means comprises a ring comprising ferrite material.

24. The electronic device of claim 21, further comprising a shell comprising magnetically transparent material surrounding the receiving or transmitting means and at least a portion of the supporting means and the displaying means.

25. The electronic device of claim 21, further comprising a near-field communication system and a wireless charging system.

26. The electronic device of claim 21, wherein the receiving or transmitting means comprises a coil antenna comprising one or more windings, and wherein the displaying means comprises a display unit.

* * * * *